United States Patent
Guan et al.

(10) Patent No.: US 11,221,880 B2
(45) Date of Patent: Jan. 11, 2022

(54) ADAPTIVE COMPUTING RESOURCE ALLOCATION APPROACH FOR VIRTUAL NETWORK FUNCTIONS

(71) Applicant: SHANGHAI JIAO TONG UNIVERSITY, Shanghai (CN)

(72) Inventors: Haibing Guan, Shanghai (CN); Ruhui Ma, Shanghai (CN); Jian Li, Shanghai (CN); Xiaokang Hu, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 88 days.

(21) Appl. No.: 16/468,312

(22) PCT Filed: Jul. 4, 2017

(86) PCT No.: PCT/CN2017/091602
§ 371 (c)(1),
(2) Date: Jun. 11, 2019

(87) PCT Pub. No.: WO2018/171081
PCT Pub. Date: Sep. 27, 2018

(65) Prior Publication Data
US 2019/0303203 A1    Oct. 3, 2019

(30) Foreign Application Priority Data
Mar. 24, 2017    (CN) .......................... 201710182640.2

(51) Int. Cl.
*G06F 9/50*     (2006.01)
*G06F 9/455*    (2018.01)
*H04L 12/26*    (2006.01)

(52) U.S. Cl.
CPC ........ *G06F 9/5011* (2013.01); *G06F 9/45558* (2013.01); *G06F 9/505* (2013.01);
(Continued)

(58) Field of Classification Search
CPC .... G06F 9/5011; G06F 9/45558; G06F 9/505; G06F 9/5077; G06F 2009/4557; G06F 2009/45583
See application file for complete search history.

(56) References Cited

U.S. PATENT DOCUMENTS 5,996,013 A *  11/1999 Delp ..................... G06F 9/5027
                                                              370/232
9,135,596 B2 *  9/2015 Dunn .................. G06Q 10/0631
(Continued)

FOREIGN PATENT DOCUMENTS

CN    102279771 A    12/2011
CN    103999049 A    8/2014
(Continued)

OTHER PUBLICATIONS

Mei Bide. A Study on the Policy of Resource Allocation in XEN Virtualized Environment. China Master's Theses Full-text Database(CMFD), Mar. 2011, 67 pages.
(Continued)

*Primary Examiner* — Jacob D Dascomb
(74) *Attorney, Agent, or Firm* — Blank Rome LLP

(57) ABSTRACT

The present invention provides an adaptive computing resource allocation approach for virtual network functions, including the following two steps: Step 1: predicting VNFs' real-time computing resource requirements; Step 1.1: offline profiling different types of VNFs, to obtain a parameter relation between the required amount of computing resources and the ingress packet rate; Step 1.2: online monitoring the network traffic information of each VNF, and predicting VNFs' required amount of computing resources with combination of the parameters in Step 1.1; Step 2: reallocating computing resources based on VNFs' resource requirements. The computing resource allocation approach includes a direct allocation approach and an incremental
(Continued)

approach. The adaptive computing resource allocation approach for virtual network functions of the present invention allocates computing resources based on VNFs' actual requirements, and remedies performance bottlenecks caused by fair allocation.

7 Claims, 1 Drawing Sheet

(52) U.S. Cl.
CPC ........ *G06F 9/5077* (2013.01); *H04L 43/0876* (2013.01); *G06F 2009/4557* (2013.01); *G06F 2009/45583* (2013.01)

(56) References Cited

U.S. PATENT DOCUMENTS

| | | | |
|---|---|---|---|
| 9,489,242 B2* | 11/2016 | Uniyal | ............... G06F 9/50 |
| 10,419,530 B2* | 9/2019 | Halpern | ............ H04L 41/0896 |
| 2013/0139152 A1 | 5/2013 | Chang et al. | |

FOREIGN PATENT DOCUMENTS

| | | |
|---|---|---|
| CN | 104283946 A | 1/2015 |
| CN | 104954220 A | 9/2015 |
| CN | 105468435 A | 4/2016 |
| CN | 105519075 A | 4/2016 |
| CN | 105703927 A | 6/2016 |
| CN | 106325997 A | 1/2017 |
| CN | 105703927 A | 6/2019 |

OTHER PUBLICATIONS

Yan Yanna. A study on adaptive allocation strategy and mechanism of virtual resource on virtual machine platform. China Master's Theses Full-text Database(CMFD), Oct. 2009, 72 pages.

PCT International Search Report and Written Opinion dated Dec. 27, 2017 in corresponding Application No. PCT/CN2017/091602, 8 pages.

Mei Bide, A Study on the Policy of Resource Allocation in XEN Virtualized Environment, Dissertation submitted Mar. 2011 for the Degree of Master, published Oct. 2011 (57 pages).

China Office Action dated May 7, 2020 in related application 201710182640.2 filed Mar. 24, 2017 (7 pages).

* cited by examiner

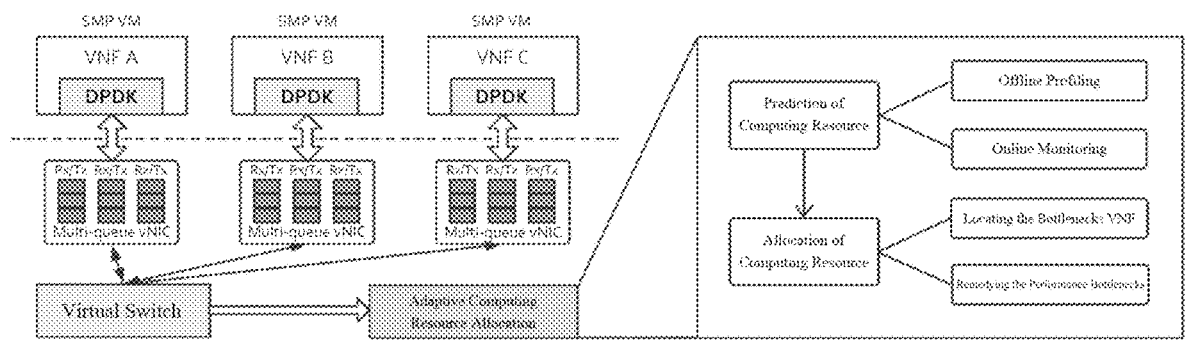

ADAPTIVE COMPUTING RESOURCE ALLOCATION APPROACH FOR VIRTUAL NETWORK FUNCTIONS

FIELD OF THE INVENTION

The present invention relates to a field of computing resource allocation, and in particular, to an adaptive computing resource allocation approach for virtual network functions.

BACKGROUND OF THE INVENTION

A network middlebox plays an important role in current network architecture, providing various functions, including data package forwarding, traffic shaping, security check, privacy protection, performance improvement and the like. However, it comes with a number of drawbacks, such as high purchasing expense, inconvenient management, poor scalability, and difficulty with launching new services. To address these issues, Network Function Virtualization (NFV) has been proposed.

The main concept of NFV is to utilize virtualization technology, and to implement the conventional hardware-based dedicated network middlebox in a manner of software, running on a universal computing platform (e.g., general-purpose servers), rather than being limited to the hardware architecture. Such network middleboxes implemented on the basis of software is referred to as Virtual Network Function (VNF). Network traffic usually needs to pass through several network middleboxes, therefore, in the NFV platform, a network service is provided by connecting a plurality of VNFs in series to construct a service chain. The performance issue of VNF is one of the challenges of NFV. Recently, there is a trend to take advantage of fast packet processing frameworks (e.g., DPDK) to improve the performance, with the characteristic of using poll mode drivers, which adopts polling to avoid the overhead of interrupt processing.

In the NFV infrastructure, a virtualization layer takes charge of the abstraction from physical resources to virtual resources. The virtual resources are usually presented to an upper layer in the form of virtual machine (VM), and are managed by virtual machine monitor (VMM), such as KVM and XEN. The VNF is deployed in VMs, and the VMM is responsible for providing various virtual resources. Wherein, the provisions and allocations of virtual computing resources are implemented by a VMM scheduler. However, the VMM scheduler is designed for ordinary virtual machines and follows the strategy of fair resource allocation, which may not adapt well to VNFs.

It is noticed that the operations of a VNF are triggered by ingress packets. We can know that the computing resources needed by a VNF is determined by two main factors: the ingress packet rate and the type of the VNF. Therefore, for one service chain, each of VNFs thereof may have diverse requirements for computing resources. However, current VMM schedulers put fairness in top priority while allocating computing resources. This kind of fair allocation may lead to resource shortage of some VNFs and resource waste of some other VNFs, thereby impeding the performance of the whole network service.

As a result, persons skilled in the art are dedicated to developing an adaptive computing resource allocation approach for virtual network functions, which allocates computing resources based on VNFs' actual requirements, and remedies performance bottlenecks caused by fair allocation.

SUMMARY OF THE INVENTION

In view of the above defects in the prior art, the technical problem to be solved by the present invention is to develop an adaptive computing resource allocation approach for virtual network functions, which allocates computing resources based on VNFs' actual requirements, and remedying the performance bottlenecks caused by fair allocation.

In order to achieve the above object, the present invention provides an adaptive computing resource allocation approach for virtual network functions, including:

Step 1: predicting VNFs' real-time computing resource requirements;

Step 2: reallocating computing resources based on VNFs' resource requirements.

Further, Step 1 specifically includes:

Step 1.1: offline profiling different types of VNFs, to obtain a parameter relation between the required amount of computing resources and the ingress packet rate;

Step 1.2: online monitoring network traffic information of each VNF, and predicting VNFs' required amount of computing resources with combination of the parameters in Step 1.1.

Further, the computing resource allocation approach includes a direct allocation approach and an incremental approach.

Further, the specific steps of Step 2 adopting the incremental approach include:

Step 2.1: counting the actually used amount of computing resources of each VNF, then calculating a difference value between the actually used amount of computing resources and the required amount of computing resources of each VNF, to find out the VNF with the smallest difference value;

Step 2.2: modifying the priority of a vCPU thread corresponding to the VNF with the smallest difference value, and increasing the supplied amount of computing resources to the VNF with the smallest difference value to remedy the performance bottlenecks.

Further, the direct allocation approach is specifically to calculate a ratio of computing resource requirement among each VNF, and allocating the total computing resources of the system to the VNFs according to the ratio.

Further, the adaptive computing resource allocation approach uses an SMP VM and a multi-queue network card.

Further, the underlying logic of the VMM scheduler is not modified, and the unbalanced computing resource allocation is realized by means of a task priority mechanism provided by the VMM scheduler.

Further, by adjusting the priority of the underlying vCPU thread, the task obtains more or less computing resources, implementing the allocation of different amounts of computing resources to the upper-level VNF.

Technical Effects

By monitoring the network traffic information of VNFs, and performing offline profiling in combination with the types of VNFs, predicting VNFs' real-time computing resource requirements; reallocating the computing resources to VNFs based on actual requirements, the performance bottlenecks caused by the conventional fair allocation mechanism are remedied. When reallocating the computing resources, either the direct allocation approach or the incremental allocation approach can be used. By setting task priorities, different amounts of computing resources are allocated to each VNF, which improves the whole performance of the network service chain.

The concepts, specific structures and resultant technical effects of the present invention are further explained below in combination with accompanying drawings, so as to fully understand the objects, features and effects of the present invention

BRIEF DESCRIPTION OF THE DRAWINGS

FIG. 1 is a schematic flow chart of an adaptive computing resource allocation approach for virtual network functions according to a preferred embodiment of the present invention.

DETAILED DESCRIPTION OF THE INVENTION

A single VNF may consist of multiple internal components, and each component may be deployed on one individual VM. For convenience of expression and understanding, only the most common "one-to-one" deployment model is considered in the present invention, i.e., one VNF is deployed on one VM.

Considering that the network traffic changes at any time, the VNFs' computing resource requirements also change with the changes of the network traffic, and the VM in the present invention adopts a symmetric multi-processor (SMP) infrastructure. One of the important features of SMP VM is the ability to well adapt to the varied resource demands During low workload periods, an SMP VM can share physical cores with other VMs; as the workload increases, the SMP VM can share cores with less VMs or even let each virtual CPU (vCPU) monopolize one physical core.

Meanwhile, in order to take full advantage of multiple vCPUs of the VM, each VM is equipped with a multi-queue network card. Receive side scaling (RSS) technology is leveraged to put ingress packets of VMs to different queues averagely, and then each vCPU is responsible for coping with one specific Receive/Transmit (Rx/Tx) queue. With the help of fast packet processing frameworks and the network card interaction, the VNF in the VM adopts polling to replace interrupt processing, to efficiently receive and transmit the packets.

As shown in FIG. 1, one preferred embodiment of the present invention provides an adaptive computing resource allocation approach for virtual network functions, including:

Step 1: predicting VNFs' real-time computing resource requirements;

Step 1.1: offline profiling different types of VNFs, to obtain a parameter relation between the required amount of computing resources and the ingress packet rate;

Step 1.2: online monitoring network traffic information of each VNF, and predicting VNFs' required amount of computing resources with combination of the parameters in Step 1.1.

Step 2: reallocating computing resources based on VNFs' resource requirements.

In Step 2, the computing resource allocation approach includes a direct allocation approach and an incremental approach.

The specific steps of Step 2 adopting the incremental approach include:

Step 2.1: counting the actually used amount of computing resources of each VNF, then calculating a difference value between the actually used amount of computing resources and the required amount of computing resources of each VNF, to find out the VNF with the smallest difference value;

Step 2.2: modifying the priority of a vCPU thread corresponding to the VNF with the smallest difference value, and increasing the supplied amount of computing resources to the VNF with the smallest difference value to remedy the performance bottlenecks. When the bottleneck VNF is located, its supplied amount of computing resource is appropriately increased, and after the system is stable, the next bottleneck is searched for, repeating in this way.

Step 2 adopting the direct allocation approach is specifically to calculate a ratio of the computing resource requirement among each VNF, and allocating the total computing resources of the system to the VNFs according to the ratio.

The adaptive computing resource allocation approach for virtual network functions according to the present invention uses an SMP VM and a multi-queue network card. The underlying logic of the VMM scheduler is not modified. When reallocating computing resources, it tends to allocate different amounts of computing resources to each VNF, and the unbalanced computing resource allocation is realized by means of a task priority mechanism provided by the VMM scheduler. The higher the task's priority is, the more computing resources are obtained. By adjusting the priority of the underlying vCPU thread, the task obtains more or less computing resources, implementing the allocation of different amounts of computing resources to the upper-level VNF.

In the adaptive computing resource allocation approach for virtual network functions according to the present invention, by monitoring the network traffic information of VNFs, performing offline profiling in combination with the types of VNFs, predicting VNFs' real-time computing resource requirements; reallocating the computing resources to VNFs based on actual requirements, the performance bottlenecks caused by the conventional fair allocation mechanism are remedied. When reallocating the computing resources, either the direct allocation approach or the incremental allocation approach can be used. By setting task priorities, different amounts of computing resources are allocated to each VNF, which improves the whole performance of the network service chain.

The preferred specific embodiments of the invention have been described in detail above. It should be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. An adaptive computing resource allocation method for virtual network functions, the method comprising at least two steps as follows:
   step 1: predicting real-time computing resource requirements of the virtual network functions; and
   step 2: reallocating computing resources based on the real-time computing resource requirements of the virtual network functions;
   wherein step 1 comprises:
      step 1.1: offline profiling different types of the virtual network functions, to obtain a relationship between a required amount of the computing resources and an ingress packet rate parameter; and step 1.2: online monitoring network traffic information of each of the virtual network functions, and predicting the required amount of the computing resources of the virtual network functions with a combination of the ingress packet rate parameter in step 1.1.

2. The adaptive computing resource allocation method for virtual network functions according to claim 1, wherein the adaptive computing resource allocation method comprises a direct allocation method and an incremental method.

3. The adaptive computing resource allocation method for virtual network functions according to claim 2, wherein steps of step 2 adopting the incremental method comprise:

step 2.1: counting an actually used amount of the computing resources of each of the virtual network functions, then calculating a difference value between the actually used amount of the computing resources and the required amount of the computing resources of each of the virtual network functions, to find out a virtual network function with a smallest difference value, and;

step 2.2: modifying a priority of a virtual central processing unit (vCPU) thread corresponding to the virtual network function with the smallest difference value, and increasing a supplied amount of the computing resources to the virtual network function with the smallest difference value to remedy performance bottlenecks.

4. The adaptive computing resource allocation method for virtual network functions according to claim 2, wherein the direct allocation method is to calculate a ratio of the computing resource requirement among each of the virtual network functions, and allocating total computing resources of a system to the virtual network functions according to the ratio.

5. The adaptive computing resource allocation method for virtual network functions according to claim 1, wherein the adaptive computing resource allocation method uses a symmetric multi-processor (SMP) virtual machine (VM) and a multi-queue network card.

6. The adaptive computing resource allocation method for virtual network functions according to claim 1, wherein an underlying logic of a virtual machine monitor (VMM) scheduler is not modified, and an unbalanced computing resource allocation is realized by means of a task priority mechanism provided by the VMM scheduler.

7. The adaptive computing resource allocation method for virtual network functions according to claim 6, wherein by adjusting a priority of an underlying virtual central processing unit (vCPU) thread, a task obtains more or less computing resources, implementing an allocation of different amounts of the computing resources to an upper-level virtual network function.

* * * * *